(12) United States Patent
Sutardja

(10) Patent No.: US 9,137,864 B2
(45) Date of Patent: Sep. 15, 2015

(54) LED LIGHTING DEVICE

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 926 days.

(21) Appl. No.: 12/761,944

(22) Filed: Apr. 16, 2010

(65) Prior Publication Data

US 2010/0264838 A1 Oct. 21, 2010

Related U.S. Application Data

(60) Provisional application No. 61/170,749, filed on Apr. 20, 2009.

(51) Int. Cl.
*H05B 41/36* (2006.01)
*H05B 33/08* (2006.01)

(52) U.S. Cl.
CPC ........ *H05B 33/0815* (2013.01); *H05B 33/0827* (2013.01); *Y02B 20/346* (2013.01)

(58) Field of Classification Search
USPC .............. 315/297, 294, 291, 209 R, 312, 254
See application file for complete search history.

(56) References Cited

U.S. PATENT DOCUMENTS

| | | | | |
|---|---|---|---|---|
| 6,618,031 B1 * | 9/2003 | Bohn et al. | ...................... | 345/83 |
| 6,867,757 B1 * | 3/2005 | Nakamura | ...................... | 345/83 |
| 6,975,070 B2 * | 12/2005 | Namba et al. | ............. | 315/209 R |
| 7,248,245 B2 * | 7/2007 | Adachi et al. | ................. | 345/102 |
| 7,327,051 B2 * | 2/2008 | Ito et al. | ......................... | 315/308 |
| 8,044,609 B2 * | 10/2011 | Liu | .............................. | 315/291 |
| 8,228,001 B2 * | 7/2012 | Fan | .............................. | 315/291 |
| 2002/0044586 A1 * | 4/2002 | Myers et al. | .................... | 372/57 |
| 2002/0158590 A1 | 10/2002 | Saito et al. | | |
| 2003/0025465 A1 * | 2/2003 | Swanson et al. | .............. | 315/291 |
| 2004/0208011 A1 * | 10/2004 | Horiuchi et al. | .............. | 362/458 |
| 2007/0013321 A1 * | 1/2007 | Ito et al. | ......................... | 315/247 |
| 2008/0116818 A1 * | 5/2008 | Shteynberg et al. | ......... | 315/192 |
| 2010/0225250 A1 * | 9/2010 | Tamegai et al. | ............... | 315/307 |

FOREIGN PATENT DOCUMENTS

| | | |
|---|---|---|
| WO | WO 00/51103 A1 | 8/2000 |
| WO | WO 2004/003869 A1 | 1/2004 |
| WO | WO 2006/135836 A1 | 12/2006 |

OTHER PUBLICATIONS

International Preliminary Report on Patentability and Written Opinion of the International Searching Authority issued Nov. 3, 2011 in International Application No. PCT/US2010/031446.
International Search Report issued in International Application No. PCT/US2010/031446, Oct. 25, 2011.

* cited by examiner

*Primary Examiner* — Douglas W Owens
*Assistant Examiner* — Jianzi Chen

(57) ABSTRACT

Aspects of the disclosure provide light emitting diode (LED) lighting devices, and methods to drive the LED lighting devices. An LED lighting device includes a transformer having a primary winding on a receiving path to receive electric energy from an energy source and a secondary winding on a driving path. A terminal of the receiving path and a terminal of the driving path have a same voltage level, such as ground. Further, the LED lighting device includes a primary switch configured to switch on the receiving path to receive and store the electric energy in the transformer, and to switch off the receiving path to allow the driving path to deliver the stored electric energy. The LED lighting device also includes an LED array coupled to the driving path to emit light in response to the delivered electric energy.

26 Claims, 6 Drawing Sheets

LED LIGHTING DEVICE

INCORPORATION BY REFERENCE

This application claims the benefit of U.S. Provisional Application No. 61/170,749, "Any Color LED Driver and Controller" filed on Apr. 20, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment in the near future to replace, for example, fluorescent lamps, bulbs, and the like.

SUMMARY

Aspects of the disclosure provide a light emitting diode (LED) lighting device. The LED lighting device can include a transformer having a primary winding on a receiving path to receive electric energy from an energy source and a secondary winding on a driving path. A terminal of the receiving path and a terminal of the driving path have a same voltage level, such as ground. Further, the LED lighting device can include a primary switch configured to switch on the receiving path to receive and store the electric energy in the transformer, and to switch off the receiving path to allow the driving path to deliver the stored electric energy. The LED lighting device also includes a first LED array coupled to the driving path to emit light in response to the delivered electric energy. In an embodiment, the transformer is configured to operate in a discontinuous conduction mode.

Additionally, the LED lighting device can include a first driving switch configured to couple the first LED array to the driving path to receive the electric energy from the driving path. Further, the LED lighting device includes a controller configured to control a turn-on time of the primary switch in order to control a light emitting power of the first LED array. The controller also controls the first driving switch.

In an embodiment, the LED lighting device includes a second LED array and a second driving switch. The second driving switch is configured to couple the second LED array to the driving path to receive the electric energy from the driving path and emit light in response to the electric energy. Then, the controller is configured to alternatively switch on the first driving switch and the second driving switch to respectively couple the first LED array and the second LED array to the driving path.

Aspects of the disclosure provide a method for driving an LED lighting device. The method can include switching on a primary switch to couple a receiving path to an energy source to receive and store electric energy in a transformer. The transformer has a primary winding on the receiving path and a secondary winding on a driving path. A terminal of the receiving path and a terminal of the driving path have a same voltage level, such as ground. Further, the method can include switching off the primary switch to decouple the receiving path from the energy source and allow the transformer to deliver the stored electric energy to a first LED array to emit light in response to the delivered electric energy. In addition, the method includes switching on a first driving switch to couple the first LED array to the driving path to receive the delivered electric energy.

In an embodiment, the method includes switching on the primary switch for a first turn-on time to store a first amount of electric energy in the transformer. Then, the method includes switching on the first driving switch to empty the first amount of electric energy. Further, the method includes switching on the primary switch for a second turn-on time to store a second amount of electric energy in the transformer. Then, the method includes switching on a second driving switch to empty the second amount of electric energy.

Aspects of the disclosure also provide an integrated circuit (IC). The integrated circuit can include a primary transistor switch configured to couple a receiving path to an energy source to receive and store the electric energy in a transformer. The transformer has a primary winding on the receiving path and a secondary winding on a driving path. A terminal of the receiving path and a terminal of the driving path have a same voltage level, such as ground. Further, the integrated circuit includes a first driving transistor switch configured to couple a first LED array to the driving path, and a controller coupled to the primary transistor switch and the first driving transistor switch. The controller is configured to switch on the primary transistor switch to enable the receiving path to receive and store the electric energy in the transformer, to switch on the first secondary transistor switch to couple the first LED array to the driving path, and to switch off the primary transistor switch to allow the transformer to deliver the stored electric energy to the first LED array for emitting light.

In an embodiment, the controller is configured to control a turn-on time of the primary transistor switch in order to control a light emitting power of the first LED array. Further, the integrated circuit includes a second driving transistor switch configured to couple a second LED array to the driving path to receive the electric energy from the driving path and emit light in response to the electric energy. The controller is further configured to alternatively switch on the first driving transistor switch and the second driving transistor switch to respectively couple the first LED array and the second LED array to the driving path.

BRIEF DESCRIPTION OF THE DRAWINGS

Various embodiments of this disclosure will be described in detail with reference to the following figures, wherein like numerals reference like elements, and wherein.

DETAILED DESCRIPTION OF EMBODIMENTS

Figure 1:
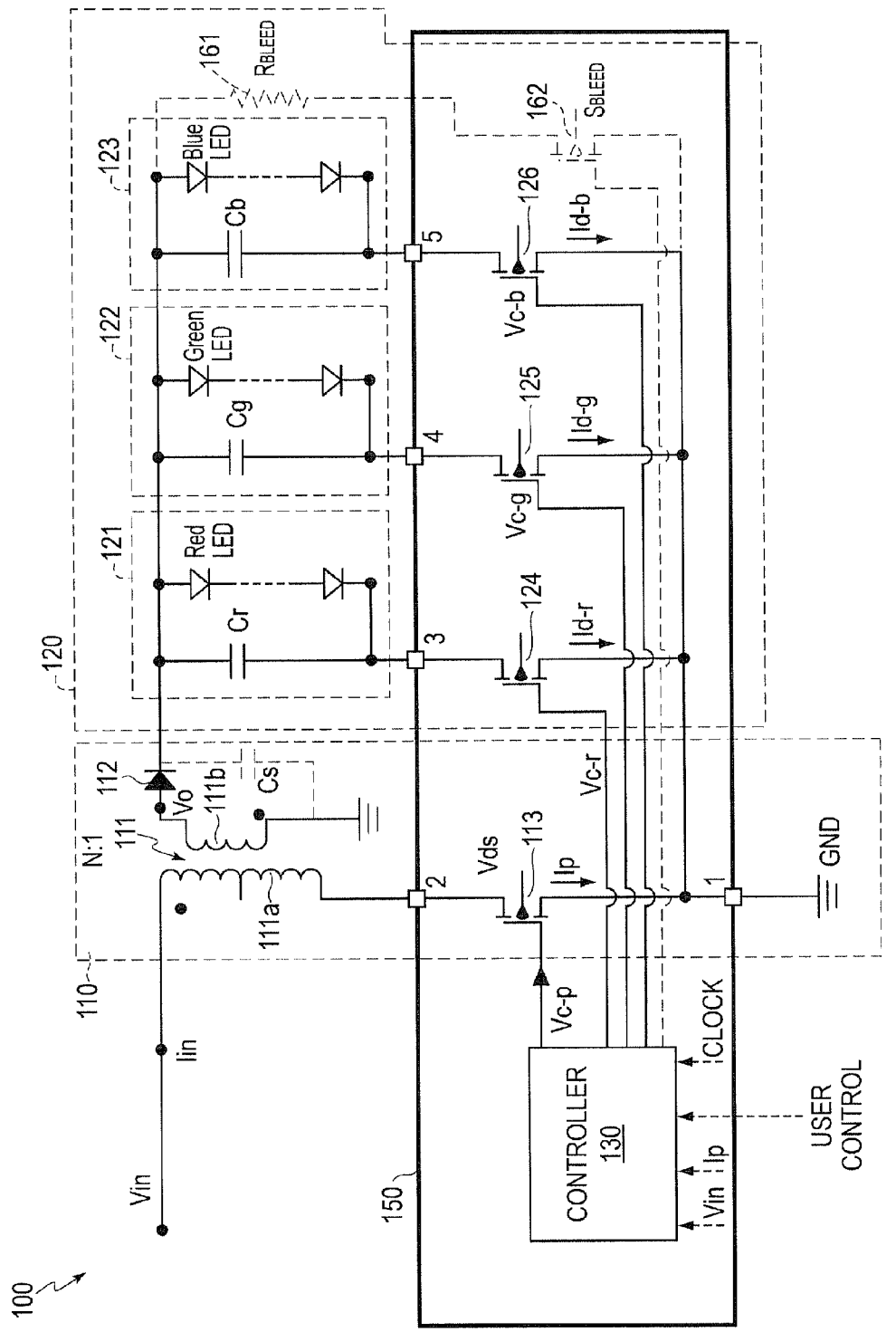
FIG. 1 shows a block diagram of a light emitting diode (LED) lighting device according to an embodiment of the disclosure.

FIG. 1 shows a block diagram of a light emitting diode (LED) lighting device 100 according to an embodiment of the disclosure. The LED lighting device 100 includes a non-isolated flyback transformer module 110, an LED module 120, and a controller module 130. These elements are coupled together as shown in FIG. 1.

The non-isolated flyback transformer module 110 receives electric energy from a source, such as a voltage supply Vin, stores the electric energy, and provides the stored electric energy to the LED module 120. The non-isolated flyback transformer module 110 includes a transformer 111, a rectifier diode 112 and a primary switch 113. The transformer 111 includes a primary winding 111a and a secondary winding 111b. The primary winding 111a and the primary switch 113 can be coupled in serial, for example, to form a receiving path to receive the electric energy from the voltage supply Vin. The voltage supply Vin can be a DC voltage supply, such as a battery module, or can be an AC voltage supply. The receiving path is switchable by controlling the primary switch 113. In an example, when the primary switch 113 is switched on, the receiving path is coupled to the voltage supply Vin to receive the electric energy; and when the primary switch 113 is switched off, the receiving path is decoupled from the voltage supply Vin.

The secondary winding 111b and the rectifier diode 112 can be coupled in serial, for example, to form a driving path to deliver electric energy to a load, such as the LED module 120. As shown, a terminal of the receiving path and a terminal of the driving path can be suitably coupled together. In FIG. 1 example, a terminal of the receiving path is connected to ground (i.e., a terminal of the primary switch 113), and a terminal of the delivering path is also connected to the same ground (i.e., a terminal of the secondary winding 111b). Thus, in this embodiment, the receiving path and the driving path are not isolated.

Further, the transformer 111, the rectifier diode 112, and the primary switch 113 can be configured to enable a flyback transformer operation. More specifically, when the primary switch 113 is switched on, the receiving path is coupled to the voltage supply Vin to receive electric energy. From the voltage supply Vin, a primary switch current Ip flows through the primary winding 111a of the transformer 111, and the primary switch 113. The polarity of the transformer 111 and the direction of the rectifier diode 112 can be arranged, such that there is no current in the secondary winding 111b of the transformer 111 when the primary switch 113 is switched on. Thus, the received electric energy is stored in the transformer 111.

When the primary switch 113 is switched off, the receiving path is decoupled from the voltage supply Vin, and the primary switch current Ip becomes zero. The polarity of the transformer 111 and the direction of the rectifier diode 112 can enable the driving path to deliver the stored electric energy to the LED module 120.

According to an embodiment of the disclosure, the primary switch 113 is repetitively switched on and off. Thus, the receiving path repetitively receives the electric energy and stores the electric energy in the transformer. Then, the driving path repetitively delivers the stored electric energy to the LED module 120. In an embodiment, the non-isolated flyback transformer module 110 operates in a discontinuous conduction mode. In the discontinuous conduction mode, the stored electric energy is emptied before the primary switch 113 is switched on again.

The LED module 120 includes a plurality of LED arrays 121-123. The plurality of LED arrays 121-123 can be coupled to the driving path to receive the electric energy, and emit light in response to the electric energy. According to an embodiment of the disclosure, the LED module 120 is switchable. As shown in FIG. 1 example, the LED module 120 includes a plurality of driving switches 124-126. The plurality of driving switches 124-126 respectively couple the plurality of LED arrays 121-123 to the driving path to receive the electric energy.

More specifically, the LED module 120 includes a red LED array 121 having a plurality of red LEDs, a green LED array 122 having a plurality of green LEDs, and a blue LED array 123 having a plurality of blue LEDs. The red LED array 121 is serially coupled with a first driving switch 124. The green LED array 122 is serially coupled with a second driving switch 125. The blue LED array 123 is serially coupled with a third driving switch 126. Of course, it should be understood that the LED module 120 can include any color or combination of color LEDs.

When a driving switch is switched on, a corresponding LED array is coupled to the driving path to receive the electric energy, and the LEDs in the corresponding LED array can emit light in response to the received electric energy. For example, when the first driving switch 124 is switched on, the red LED array 121 is coupled to the driving path. The driving path drives a current Id-r flowing through the red LED array 121 and the first driving switch 124. Then, the plurality of red LEDs in the red LED array 121 emit red light. Similarly, when the second driving switch 125 is switched on, the green LED array 122 is coupled to the driving path. The driving path drives a current Id-g flowing through the green LED array 122 and the second driving switch 125. Then, the plurality of green LEDs in the green LED array 122 emit green light. When the third driving switch 126 is switched on, the blue LED array 123 is coupled to the driving path. The driving path drives a current Id-b flowing through the blue LED array 123 and the third driving switch 126. The plurality of blue LEDs in the blue LED array 123 then emit blue light.

In the FIG. 1 example, each LED array is coupled to a respective smoothing capacitor, such as Cr, Cg or Cb. The smoothing capacitor reduces variations of the current flowing through the respective LED array. In another example, the LED lighting device 100 includes a smoothing capacitor Cs coupled to the driving path as shown in FIG. 1 to reduce variations of the current flowing through the LED module 120.

The controller module 130 respectively controls the primary switch 113, and the plurality of driving switches 124-126 for achieving any suitable features. In an embodiment, the controller module 130 receives a periodic signal, such as a clock signal, and controls the various switches based on the clock signal.

In another embodiment, the controller module 130 receives various feedback signals from other components of the LED lighting device 100. The feedback signals can indicate states, status, or performance of the other components. The controller module 130 controls the various switches based on the feedback signals. In an example, the controller module 130 receives a signal that is indicative of the voltage supply Vin. In another example, the controller module 130 receives a signal that is indicative of the primary switch current Ip.

In another embodiment, the controller module 130 receives external signals, for example, from a user, or from another device coupled to the LED lighting device 100. Then, the controller module 130 controls the various switches based on the received external signals.

According to an embodiment of the disclosure, light emission by each of the plurality of LED arrays 121-123 can be independently controlled. The plurality of LED arrays 121-123 may have the same or different size and/or color. In an example, the red LED array 121 is controlled to emit red light in a first time period, the green LED array 122 is controlled to emit green light in a second time period, and the blue LED array 123 is controlled to emit blue light in a third time period. In addition, the controller module 130 can respectively control light emitting powers of the plurality of LED arrays 121-123.

More specifically, in the first time period, the controller module 130 switches on the first driving switch 124, and keeps the second driving switch 125 and the third driving switch 126 switched off. Thus, the red LED array 121 is coupled to the driving path, and the green LED array 122 and the blue LED array 123 are decoupled from the driving path. Further, the controller module 130 switches on the primary switch 113 for a first turn-on time, and then switches off the primary switch 113. Thus, during the first turn-on time, the receiving path receives electric energy from the voltage supply Vin, and store the electric energy in the transformer 111. The amount of the stored electric energy is a function of the first turn-on time. When the primary switch 113 is switched off, the driving path delivers the stored electric energy to the red LED array 121 to emit red light. In an embodiment, the non-isolated flyback transformer module 110 operates in the discontinuous conduction mode, thus substantially all the stored electric energy is emptied by loads, such as the red LED array 121. Consequently, the red light emitting power is a function of the stored electric energy, and thus is a function of the first turn-on time.

In the second time period, the controller module 130 switches on the second driving switch 125, and keeps the first driving switch 124 and the third driving switch 126 switched off. Thus, the green LED array 122 is coupled to the driving path, and the red LED array 121 and the blue LED array 123 are decoupled from the driving path. Further, the controller module 130 switches on the primary switch 113 for a second turn-on time, and then switches off the primary switch 113. Thus, during the second turn-on time, the receiving path receives electric energy from the voltage supply Vin, and store the electric energy in the transformer 111. The amount of the stored electric energy is a function of the second turn-on time. When the primary switch 113 is switched off, the driving path delivers the stored electric energy to the green LED array 122 to emit green light. In an embodiment, the non-isolated transformer module 110 operates in the discontinuous conduction mode, thus substantially all the stored electric energy is emptied by loads, such as the green LED array 122. Consequently, the green light emitting power is a function of the stored electric energy, and thus is a function of the second turn-on time.

Similarly, in the third time period, the controller module 130 switches on the third driving switch 126, and keeps the first driving switch 124 and the second driving switch 125 switched off. Thus, the blue LED array 123 is coupled to the driving path, and the red LED array 121 and the green LED array 122 are decoupled from the driving path. Further, the controller module 130 switches on the primary switch 113 for a third turn-on time, and then switches off the primary switch 113. Thus, during the third turn-on time, the receiving path receives electric energy from the voltage supply Vin, and store the electric energy in the transformer 111. The amount of the stored electric energy is a function of the third turn-on time. When the primary switch 113 is switched off, the driving path delivers the stored electric energy to the blue LED array 123 to emit blue light. In an embodiment, the non-isolated transformer module 110 operates in the discontinuous conduction mode, thus substantially all the stored electric energy is emptied by loads, such as the blue LED array 123. Consequently, the blue light emitting power is a function of the stored electric energy, and is a function of the third turn-on time.

The controller module 130 can respectively control the red light emitting power, the green light emitting power, and the blue light emitting power by independently controlling the first turn-on time, the second turn-on time, and the third turn-on time. In addition, the controller module 130 can achieve any color combination by suitably adjusting the first turn-on time, the second turn-on time, and the third turn-on time. The duration of the turn-on time associated with each of the plurality of LED arrays 121-123 may be the same or different.

According to an aspect of the disclosure, when the voltage supply Vin is an AC input, the LED lighting device 100 can be suitably configured to implement power factor correction. In an embodiment, the voltage supply Vin has a frequency of 50 Hz. The controller module 130 switches the primary switch 113 at a much higher frequency than 50 Hz, for example, in the order of KHz. Each time, the controller module 130 switches on and switches off the primary switch 113, the primary switch current Ip has a spike. The peak value of the spike is a function of the voltage supply Vin during the switch-on time. Thus, an average of the primary switch current Ip has substantially the same phase as the voltage supply Vin.

According to another aspect of the disclosure, the primary switch 113, the plurality of driving switches 124-126, and the controller module 130 can be implemented using semiconductor technology, such as silicon implementation, and the like. In an embodiment, the primary switch 113, the plurality of driving switches 124-126, and the controller module 130 is implemented on a silicon chip 150 by a silicon manufacturing process. The silicon manufacturing process can produce high voltage switches, such as the primary switch 113. In an example, the primary switch 113 is required to sustain more than 500 V. The driving switches 124-126 can be manufactured as the high voltage switches, or can be manufactured as low voltage switches. In an example, the driving switches 124-126 are required to sustain, for example, above 30 V. The silicon manufacturing process can also produce logic circuits, such as the controller module 130. The IC chip 150 includes terminals, such as terminals 1-5 in FIG. 1. The terminals 1-5 couple the components in the IC chip 150 to the transformer 111, the LED arrays 121-123, and ground as shown in FIG. 1.

In another embodiment, the primary switch 113, the plurality of driving switches 124-126, and the controller module 130 can be implemented on different chips, and the different chips can be suitably coupled together. In an example, the primary switch 113, the plurality of driving switches 124-126 are implemented in a first chip using a high voltage manufacturing process, and the controller module 130 is implemented in a second chip using a low voltage manufacturing process. The first chip and the second chip can be suitably coupled together. It is noted that the controller module 130 can be implemented as a general processor executing software instructions.

It is noted that the transformer 111 can include additional secondary windings. The additional secondary windings can be similarly configured as the secondary winding 111b to drive additional LED modules.

It should be understood that the receiving path and the driving path can include additional components, such as resistors, additional switches, and the like. In an embodiment, the LED lighting device 100 includes a switchable bleed path, for example, having a bleed resistor 161 and a bleed switch 162, coupled to the driving path. The controller module 130 can suitably switch on the bleed switch 162 to bleed off electric energy from the driving path. Thus, the controller module 130 can achieve any color combination by suitably switching on the bleed switch 162. In an example, the controller module 130 switches on the primary switch 113 for a constant turn-on time in each clock cycle. Further, the controller module 130 adjusts the turn-on time of the bleed switch 162 in each clock cycle. More specifically, the controller module 130 adjusts a first turn-on time of the bleed switch 162 in a red light clock cycle to adjust the red light emitting power, a second turn-on time of the bleed switch 162 in a green light clock cycle to adjust the green light emitting power, and a third turn-on time of the bleed switch 163 in a blue light clock cycle to adjust the blue light emitting power.

Figure 2:
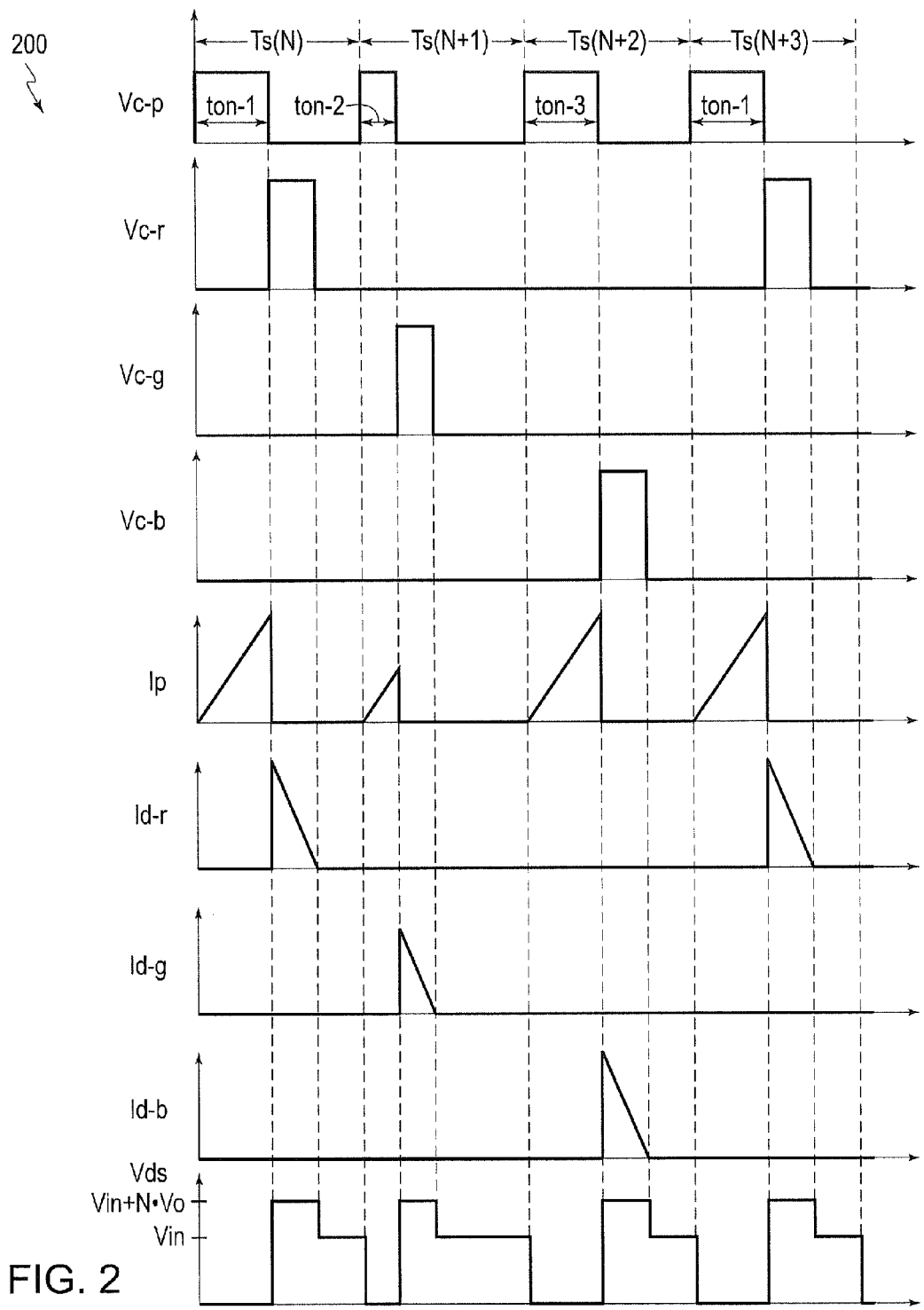
FIG. 2 shows a waveform plot of an LED lighting device according to an embodiment of the disclosure.

FIG. 2 shows a waveform plot 200 for the LED lighting device 100 according to an embodiment of the disclosure. The waveform plot 200 includes a primary switch control voltage Vc-p, a first driving switch control voltage Vc-r, a second driving switch control voltage Vc-g, a third driving switch control voltage Vc-b, a primary switch current Ip, a first driving switch current Id-r, a second driving switch current Id-g, a third secondary current Id-b, and a voltage across the primary switch Vds. According to an embodiment of the disclosure, Vc-p, Vc-r, Vc-g and Vc-b are provided by the controller module 130, and can result in Ip, Id-r, Id-g, Id-b and Vds.

The controller module 130 repetitively increases Vc-p to a high voltage, and decreases Vc-p to a low voltage. In an embodiment, the controller module 130 generates Vc-p based on a clock signal. In each clock period, Vc-p has a pulse. When Vc-p increases to the high voltage, the primary switch 113 is switched on, and when Vc-p decreases to the low voltage, the primary switch 113 is switched off.

Additionally, in each clock period, the controller module 130 controls a pulse width of Vc-p in order to control a turn-on time of the primary switch 113. In FIG. 2 example, in a first clock period Ts(N), Vc-p pulse width is ton-1, thus the primary switch 113 has a first turn on time ton-1; in a second period Ts(N+1), Vc-p pulse width is ton-2, thus the primary switch 113 has a second turn-on time ton-2; and in a third period Ts(N+2), Vc-p pulse width is ton-3, thus the primary switch 113 has a third turn-on time ton-3.

When the primary switch 113 is switched on, the primary switch current Ip flows through the non-isolated flyback transformer module 110, and electric energy can be stored in the non-isolated flyback transformer module 110. Thus, the turn-on times determine the amount of electric energy stored in the non-isolated flyback transformer module 110 during the turn-on times. For example, when the second turn-on time ton-2 is smaller than the first turn-on time ton-1, the amount of electric energy stored in the non-isolated flyback transformer module 110 during the second clock period is smaller than the amount of electric energy stored during the first clock period.

Further, in each clock period, the controller module 130 selectively switches on a driving switch. When the driving switch is switched on, a corresponding LED array is coupled to the driving path of the non-isolated flyback transformer module 110. In the FIG. 2 example, in the first clock period Ts(N), the controller module 130 increases Vc-r to switch on the first driving switch 124. Thus, the red LED array 121 is coupled to the driving path of the non-isolated flyback transformer module 110. After a time duration, the controller module 130 decreases Vc-r to switch off the first driving switch 124 and decouple the red LED array 121 from the driving path. In the second clock period Ts(N+1), the controller module 130 increases Vc-g to switch on the second driving switch 125. Thus, the green LED array 122 is coupled to the driving path of the non-isolated flyback transformer module 110. After a time duration, the controller module 130 decreases Vc-g to switch off the second driving switch 125 and decouple the green LED array 122 from the driving path. In the third clock period Ts(N+2), the controller module 130 increases Vc-b to switch on the third driving switch 126. Thus, the blue LED array 123 is coupled to the driving path of the non-isolated flyback transformer module 110. After a time duration, the controller module 130 decreases Vc-b to switch off the third driving switch 126 and decouple the blue LED array from the driving path.

When the controller module 130 switches off the primary switch 113, the stored electric energy is delivered to the coupled LED array. For example, in the first clock period Ts(N), the electric energy is delivered to the red LED array 121. The red LED array 121 emits red light in response to the electric energy, and a current flows through the red LED array 121 and the first driving switch 124, as shown by the first driving switch current Id-r in FIG. 2.

Similarly, in the second clock period Ts(N+1), the electric energy is delivered to the green LED array 122. The green LED array 122 emits green light in response to the electric energy, and a current flows through the green LED array 122 and the second driving switch 125, as shown by the second driving switch current Id-g in FIG. 2.

In the third clock period Ts(N+2), the electric energy is delivered to the blue LED array 123. The blue LED array 123 emits blue light in response to the electric energy, and a current flows through the blue LED array 123 and the third driving switch 126, as shown by the third driving switch current Id-b in FIG. 2.

According to an embodiment of the disclosure, the non-isolated flyback transformer module 110 operates in the discontinuous conduction mode. Thus, in each clock cycle, the stored electric energy is substantially emptied, for example, by the corresponding LED array. The driving switches can be switched off after the stored electric energy is emptied.

Vds shows the voltage across the primary switch 113. When the primary switch 113 is switched on, Vds is substantially equivalent to zero. When the primary switch 113 is switched off, Vds includes a first portion due to the voltage supply Vin, and a second portion due to an output voltage Vo of the non-isolated flyback transformer module 110. When the stored electric energy is emptied, Vds is substantially equivalent to the voltage supply Vin.

FIG. 2 shows that the LED lighting device 100 can achieve any color by suitably adjusting the turn-on time of the primary switch 113. It is noted that the LED lighting device 100 can also adjust the turn-on time of the bleed switch 162 to achieve any color.

In the FIG. 2 example, the leading edges of Vc-r, Vc-g, and Vc-b are aligned with the trailing edges of Vc-p. In another example, the leading edges of Vc-r, Vc-g and Vc-b are not aligned with the trailing edge of the Vc-p. For example, Vc-r can rise at any suitable time within ton-1, and has a relatively high voltage at the trailing edge of the Vc-p in the first clock cycle Ts(N). Similarly, Vc-g can rise at any suitably time within ton-2, and has a relatively high voltage at the trailing edge of Vc-p in the second clock cycle Ts(N+1); and Vc-b can rise at any suitable time within ton-3, and has a relatively high voltage at the trailing edge of Vc-p in the third clock cycle Ts(N+2).

Further, in the FIG. 2 example, the trailing edges of Vc-r, Vc-g, and Vc-b are respectively aligned with Id-r, Id-g, and Id-b being zero. In another example, the trailing edges of Vc-r, Vc-g, and Vc-b are not aligned with Id-r, Id-g, and Id-b being zero. For example, Vc-r can fall at any suitable time after the stored electric energy is emptied in the first clock cycle Ts(N) (when Id-r is decreased to zero). Similarly, Vc-g can fall at any suitable time after the stored electric energy is emptied in the second clock cycle Ts(N+1) (when Id-g is decreased to zero), and Vc-b can fall at any suitable time after the stored electric energy is emptied in the third clock cycle Ts(N+2) (when Id-b is decreased to zero).

Figure 3A:
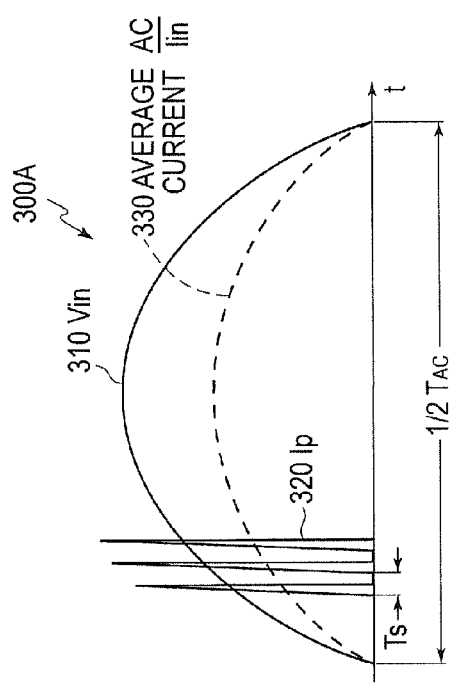
FIG. 3A-C show other waveform plots of an LED lighting device according to an embodiment of the disclosure.

FIG. 3A shows another waveform plot 300A according to an embodiment of the disclosure. The waveform plot 300A includes waveform 310 for the voltage supply Vin, waveform 320 for the primary switch current Ip and waveform 330 for an average of the input current Iin. According to an embodiment of the disclosure, the voltage supply Vin can be an AC voltage supply, having a period of $T_{AC}$. In an example, $T_{AC}$ corresponds to 50 Hz. In another example, $T_{AC}$ corresponds to 60 Hz. Waveform 310 shows a sinusoidal curve in a half period for the voltage supply Vin.

Waveform 320 shows current spikes corresponding to operations of the primary switch 113. According to an embodiment of the disclosure, the primary switch 113 is periodically switched on and off. In an example, the switching frequency of the primary switch 113 is in the order of KHz. When the primary switch 113 is switched on, current Ip flows from the voltage supply Vin through the receiving path. The receiving path includes the primary winding 111a of the transformer 111, and the primary switch 113. When the primary switch 113 is switched off, the primary switching current Ip stops. The primary switching current Ip has spikes corresponding to the supply voltage Vin. For example, a peak value of a spike is a function of the supply voltage Vin.

Waveform 330 shows an average of the input current Iin. As shown in FIG. 3A, the average of input current Iin has substantially the same phase as the input supply voltage Vin. Thus, the LED lighting device maximizes the power delivery from the voltage supply Vin, and implements power factor correction for AC power.

Figure 3B:
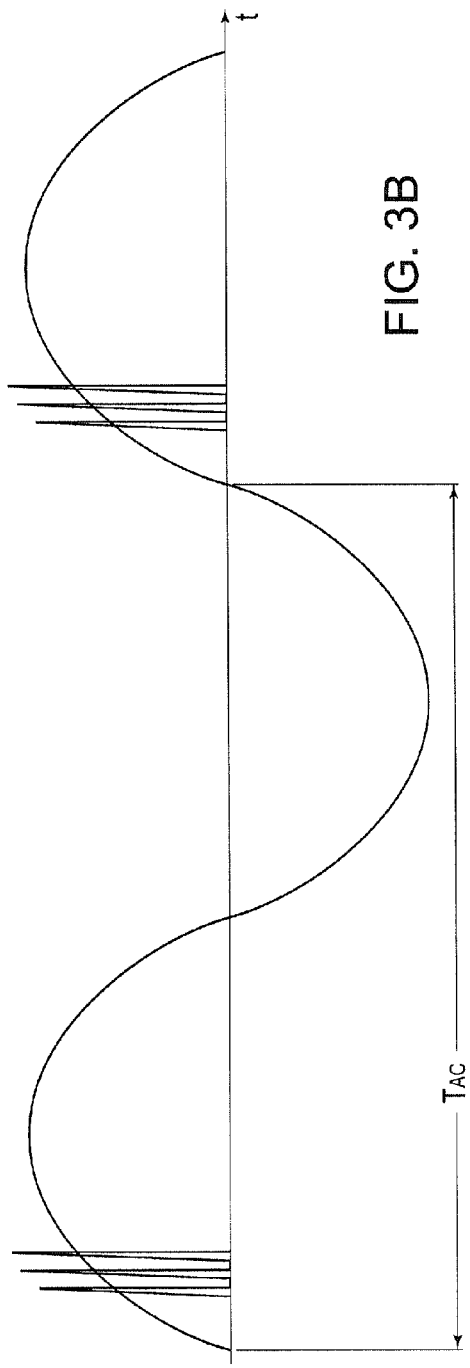
Figure 3C:
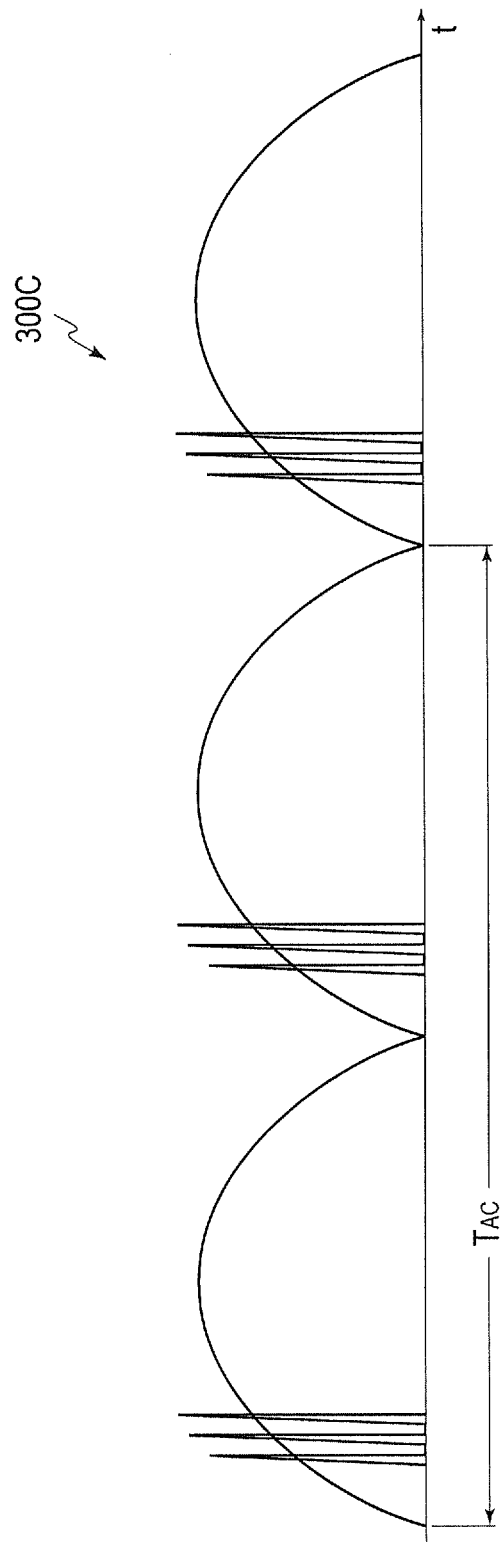

In an embodiment, the primary switch 113 is switched off during the other half period of $T_{AC}$ when Vin is negative, as shown in FIG. 3B. In another embodiment, the supply voltage Vin is rectified such that Vin is positive in the other half period of $T_{AC}$. Then, the primary switch 113 can be periodically switched in the other half period of $T_{AC}$, as shown in FIG. 3C.

Figure 4:
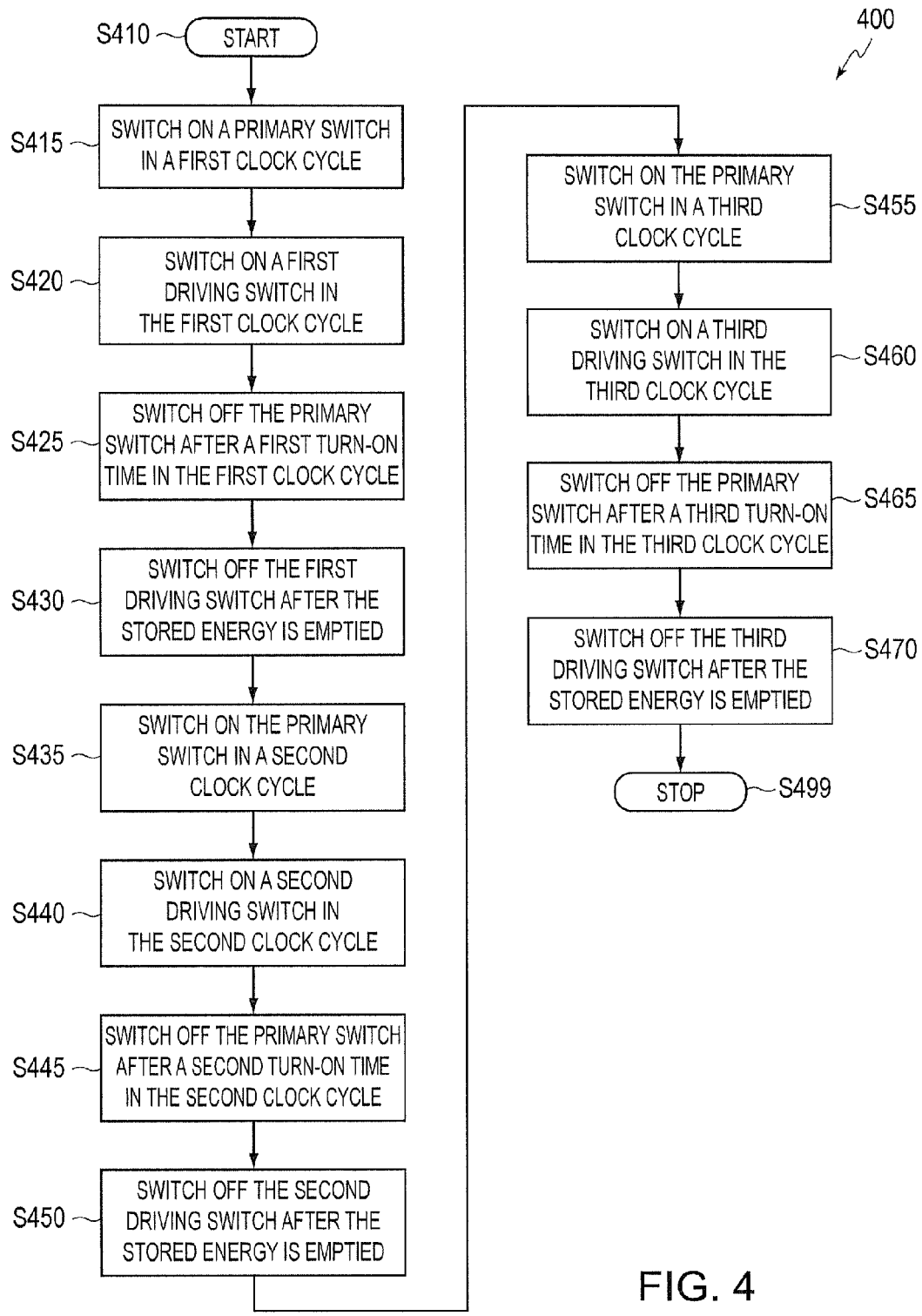
FIG. 4 shows a flow chart outlining a process for controlling an LED lighting device according to an embodiment of the disclosure.

FIG. 4 shows a flow chart outlining a process example 400 for controlling the LED lighting device 100 according to an embodiment of the disclosure. The process starts at S410, and proceed to S415.

At S415, the controller module 130 switches on the primary switch 113 in a first clock cycle. In an embodiment, the controller module 130 controls the operations of the LED lighting device 100 according to a clock signal. In an example, the clock signal has a frequency in the order of KHz. When the primary switch 113 is switched on, the non-isolated flyback transformer module 110 receives electric energy from the voltage supply Vin, and stores the electric energy.

At S420, the controller module 130 switches on the first driving switch 124 in the first clock cycle. When the first driving switch 124 is switched on, the red LED array 121 is coupled to the driving path of the non-isolated flyback transformer module 110. In an embodiment, the controller module 130 keeps the second driving switch 125 and the third driving switch 126 switched off in the first clock cycle.

At S425, the controller module 130 switches off the primary switch 113 after a first turn-on time in the first clock cycle. The first turn-on time determines a first amount of electric energy stored in the non-isolated flyback transformer module 110. When the primary switch 113 is off, the stored electric energy is delivered to the to the red LED array 121 coupled to the driving path of the non-isolated flyback transformer module 110. The red LED array 121 then emits red light in response to the delivered electric energy.

At S430, the controller module 130 switches off the first driving switch 113. According to an embodiment of the disclosure, the controller module 130 switches off the first driving switch 113 after the first amount of electric energy has been substantially emptied by loads, such as the red LED array 121.

At S435, the controller module 130 switches on the primary switch 113 in a second clock cycle to store electric energy in the non-isolated flyback transformer module 110.

At S440, the controller module 130 switches on the second driving switch 125 in the second clock cycle. When the second driving switch 125 is switched on, the green LED array 122 is coupled to the driving path of the non-isolated flyback transformer module 110. In an example, the controller module 130 keeps the first driving switch 124 and the third driving switch 126 switched off.

At S445, the controller module 130 switches off the primary switch 113 after a second turn-on time in the second clock cycle. The second turn-on time determines a second amount of electric energy stored in the non-isolated flyback transformer module 110. When the primary switch 113 is off, the stored electric energy is delivered to the to the green LED array 122 coupled to the driving path of the non-isolated flyback transformer module 110. The green LED array then emits green light in response to the delivered electric energy.

At S450, the controller module 130 switches off the second driving switch 125. According to an embodiment of the disclosure, the controller module 130 switches off the second driving switch 125 when the second amount of electric energy has been substantially emptied by loads, such as the green LED array 122.

At S455, the controller module 130 switches on the primary switch 113 in a third clock cycle to store electric energy in the non-isolated flyback transformer module 110.

At S460, the controller module 130 switches on the third driving switch 126 in the third clock cycle. When the third driving switch 126 is switched on, the blue LED array 123 is coupled to the driving path of the non-isolated flyback transformer module 110. In an example, the controller module 130 keeps the first driving switch 124 and the second driving switch 125 switched off.

At S465, the controller module 130 switches off the primary switch 113 after a third turn-on time in the third clock cycle. The third turn-on time determines a third amount of electric energy stored in the non-isolated flyback transformer module 110. When the primary switch 113 is switched off, the stored electric energy is delivered to the to the blue LED array 123 coupled to the driving path of the non-isolated flyback transformer module 110. The blue LED array then emits blue light in response to the delivered electric energy.

At S470, the controller module 130 switches off the third driving switch 126. According to an embodiment of the disclosure, the controller module 130 switches off the third driving switch 126 when the third amount of electric energy has been substantially emptied by loads, such as the blue LED array 123. The process then proceeds to S499 and terminates.

It is noted that the process 400 can be repeated to control the LED lighting device 100 to emit light. Further, the process 400 can be suitably adjusted for various lighting features. For example, S415-S430 are repetitively executed to control the LED lighting device 100 to be a red lighting device.

Figure 5:
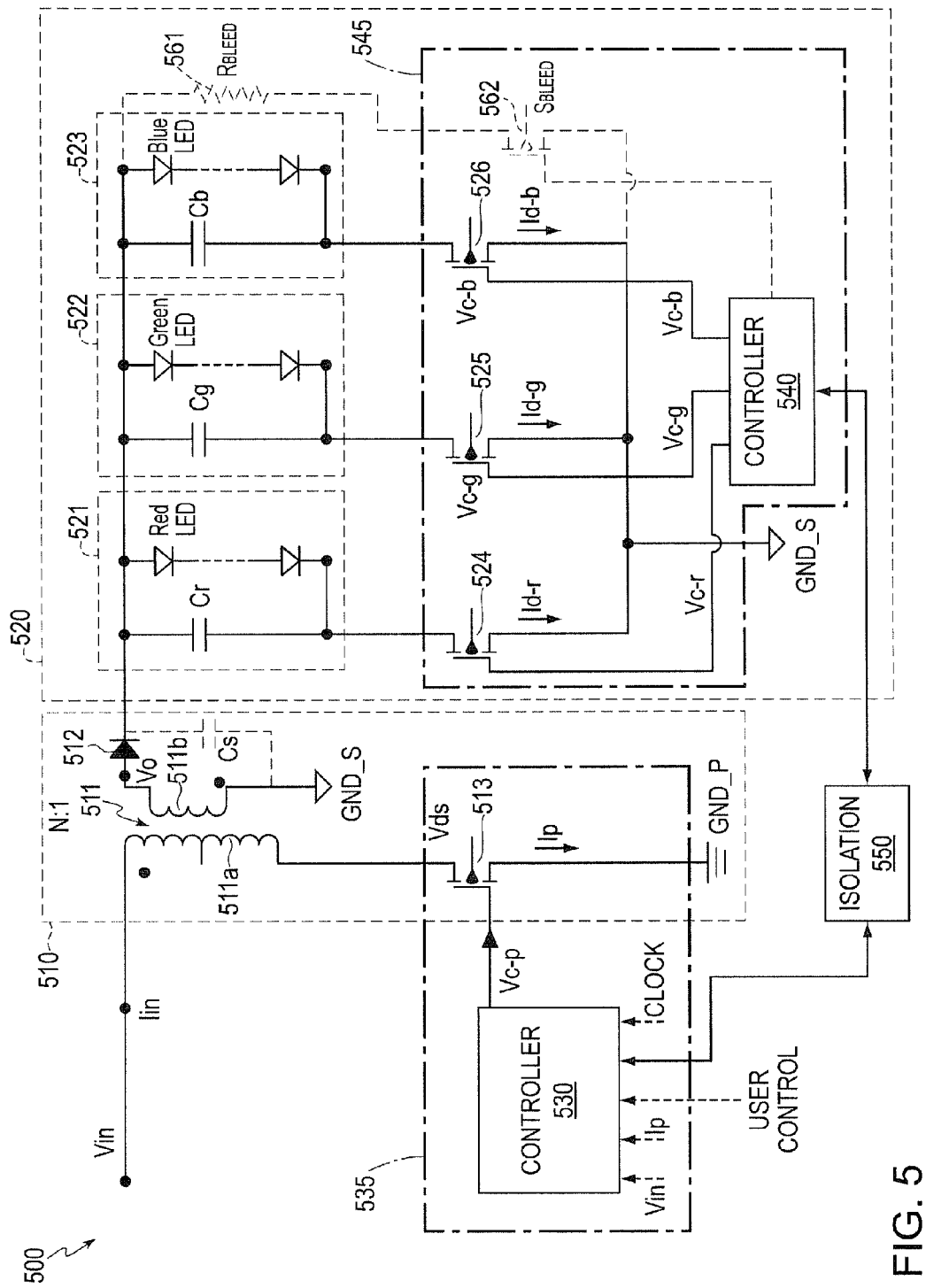
FIG. 5 shows a block diagram of a light emitting diode (LED) lighting device according to another embodiment of the disclosure.

FIG. 5 shows a block diagram of a light emitting diode (LED) lighting device 500 according to another embodiment of the disclosure. The LED lighting device 500 operates similarly to the LED lighting device 100 described above. The LED lighting device 500 also utilizes certain components that are identical or equivalent to those used in the LED lighting device 100; the description of these components has been provided above and will be omitted here for clarity purposes. However, in this embodiment, the LED lighting device 500 is structurally different in a number of respects.

The LED lighting device 500 includes an isolated flyback transformer module 510. The transformer module 510 includes a transformer 511 that has a primary winding 511a and a secondary winding 511b. The secondary winding 511b is coupled to a first reference potential, which may include, for example, a ground potential GND_S as shown in FIG. 5.

The LED lighting device 500 further includes the primary switch 513. One terminal of the primary switch 513 is coupled to a second reference potential, which may include, for example, a ground potential GND_P as shown in FIG. 5. It should be noted that even though the first and second reference potentials may both be ground potential, they are different in the sense that they are not coupled to or do not share the same ground potential. Another terminal of the primary switch 513 is coupled to a first controller 530. The first controller 530 controls the operation of the primary switch 513. In an example, the first controller 530 and the primary switch 513 are integrated together in a single module as indicated by the dotted box 535.

The LED lighting device 500 also includes a plurality of driving switches 524, 525 and 526, that are similar to the previously described driving switches 124, 125 and 126 in connection with the LED lighting device 100 in FIG. 1. The plurality of driving switches 524, 525, 526 are controlled by a second controller 540 and similarly interact with a plurality of LED arrays 521, 522 and 523. The plurality of LED arrays 521, 522 and 523 are similar to the previously described LED arrays 121, 122 and 123 in connection with the LED lighting device 100 in FIG. 1. In an example, the second controller 540 and the plurality of driving switches 524, 525 and 526 are integrated together in a single module as indicated by dotted box S45.

The first and second controllers 530 and 540 collectively perform the same functions as the controller module 130. In the embodiment shown in FIG. 5, the first and second controllers 530 and 540 are implemented in separate modules 535 and S45 respectively. The first and second controllers 530 and 540 have a master/slave relationship. Either one of the first and second controllers 530 and 540 can serve as the master and the other as the slave. The first and second controllers 530 and 540 are buffered by an isolation block 550. The isolation block 550 can include, for example, an optocoupler or a transformer. Since the secondary winding 511b and the primary switch 513 do not share the same ground potential, the isolation block 550 is used to provide galvanic isolation thereby protecting the components in the LED lighting device 500.

In an embodiment, the modules 535 and S45 and the isolation block 550 are implemented as a single integrated chip package. Based on the disclosure and teachings provided herein, it should be noted that other implementation configurations may be used. For example, the module S45 is implemented in a first IC using a low-voltage technology, and the module 535 is implemented in a second IC using a high-voltage technology. The first IC and the second IC can be coupled together by the isolation block 550. The isolation block 550 uses any suitable isolation component, such as optocoupler, transformer, and the like, to enable delivering between the first and second ICs control signals while keeping the first and second ICs electrically isolated.

While the invention has been described in conjunction with the specific embodiments thereof, it is evident that many alternatives, modifications, and variations can be made to the embodiments described above. Accordingly, embodiments of the invention as set forth herein are intended to be illustrative, not limiting. There are changes that may be made without departing from the scope of the invention.

What is claimed is:

1. A light emitting diode (LED) lighting device, comprising:
    a transformer having a primary winding on a receiving path to receive electric energy from an energy source and a secondary winding on a driving path, a terminal of the receiving path and a terminal of the driving path having a same voltage level;
    a primary switch configured to switch on the receiving path to receive and store the electric energy in the transformer, and to switch off the receiving path to allow the driving path to deliver the stored electric energy, wherein the stored electric energy is discharged exclusively to one LED array of a plurality of LED arrays in each clock cycle of a controller before the primary switch is switched on again, the controller independently controlling each LED array that is connected in parallel with a capacitor;
    a first LED array of the LED arrays coupled to the driving path to emit light in response to the delivered electric energy;
    a first driving switch configured to couple the first LED array to the driving path to receive the electric energy from the driving path; and
    a bleed circuit configured to adjust a turn-on time of a bleed switch of the bleed circuit in a clock cycle of a colored light to adjust a light emitting power of the colored light, the bleed circuit including a resistor and the bleed switch coupled together in series to the driving path, the resistor coupled to the plurality of LED arrays in parallel, the bleed switch coupled to a plurality of driving switches in parallel.

2. The LED lighting device of claim 1, further comprising:
    the controller configured to control a turn-on time of the primary switch in order to control a light emitting power of the first LED array.

3. The LED lighting device of claim 2, further comprising:
    a second LED array; and
    a second driving switch configured to couple the second LED array to the driving path to receive the electric energy from the driving path, wherein the second LED array emits light in response to the electric energy.

4. The LED lighting device of claim 3, wherein the controller is configured to alternatively switch on the first driving switch and the second driving switch to respectively couple the first LED array and the second LED array to the driving path.

5. The LED lighting device of claim 1, wherein the terminal of the receiving path and the terminal of the driving path are at ground level.

6. The LED lighting device of claim 1, wherein the driving switches being configured to couple corresponding LED array of the LED arrays to the driving path to receive the electric energy from the driving path.

7. A method for driving a light emitting diode (LED) lighting device, comprising:
    switching on a primary switch to couple a receiving path to an energy source to receive electric energy and to store the received electric energy in a transformer, the transformer having a primary winding on the receiving path and a secondary winding on a driving path, wherein a terminal of the receiving path and a terminal of the driving path have a same voltage level;

switching off the primary switch to decouple the receiving path from the energy source and allow the transformer to deliver the stored electric energy to a first LED array of a plurality of LED arrays via the driving path, wherein the first LED array emits light in response to the delivered electric energy, wherein the stored electric energy is discharged exclusively to one LED array of the LED arrays in each clock cycle of a controller before switching on the primary switch again, the controller independently controlling each LED array that is connected in parallel with a capacitor;

switching on a first driving switch to couple the first LED array to the driving path to receive the delivered electric energy; and adjusting a turn-on time of a bleed switch of a bleed circuit in a clock cycle of a colored light to adjust a light emitting power of the colored light, the bleed circuit including a resistor and the bleed switch coupled together in series to the driving path, the resistor coupled to the plurality of LED arrays in parallel, the bleed switch coupled to a plurality of driving switches in parallel.

8. The method of claim 7, wherein switching on the primary switch to couple the receiving path to the energy source to receive the electric energy, further comprises:
switching on the primary switch for a first turn-on time to store a first amount of electric energy in the transformer.

9. The method of claim 8, wherein switching on the first driving switch to couple the first LED array to the driving path to receive the delivered electric energy, further comprises:
switching on the first driving switch to empty the first amount of electric energy via the first LED array.

10. The method of claim 8, further comprising:
switching on the primary switch for a second turn-on time to store a second amount of electric energy in the transformer.

11. The method of claim 10, further comprising:
switching on a second driving switch to empty the second amount of electric energy via a second LED array.

12. The method of claim 7, wherein the terminal of the receiving path and the terminal of the driving path are at ground level.

13. An integrated circuit (IC), comprising:
a primary transistor switch configured to couple a receiving path to an energy source to receive and store electric energy in a transformer, the transformer having a primary winding on the receiving path and a secondary winding on a driving path, wherein a terminal of the receiving path and a terminal of the driving path have a same level, wherein the stored electric energy is discharged exclusively to one light emitting diode (LED) array of the LED arrays in each clock cycle of a controller before the primary transistor switch is switched on again, the controller independently controlling each LED array that is connected in parallel with a capacitor;
a first driving transistor switch configured to couple a first LED array to the driving path;
the controller configured to switch on the primary transistor switch to enable the receiving path to receive and store the electric energy in the transformer, to switch on the first driving transistor switch to couple the first LED array to the driving path, and to switch off the primary transistor switch to allow the transformer to deliver the stored electric energy to the first LED array for emitting light; and
a bleed circuit configured to adjust a turn-on time of a bleed switch of the bleed circuit in a clock cycle of a colored light to adjust a light emitting power of the colored light, the bleed circuit including a resistor and the bleed switch coupled together in series to the driving path, the resistor coupled to a plurality of LED arrays in parallel, the bleed switch coupled to a plurality of driving switches in parallel.

14. The IC of claim 13, wherein the controller is further configured to control a turn-on time of the primary transistor switch in order to control a light emitting power of the first LED array.

15. The IC of claim 14, further comprising:
a second driving transistor switch configured to couple a second LED array to the driving path to receive the electric energy from the driving path, wherein the second LED array emits light in response to the electric energy.

16. The IC of claim 15, wherein the controller is further configured to alternatively switch on the first driving transistor switch and the second driving transistor switch to respectively couple the first LED array and the second LED array to the driving path.

17. The IC of claim 15, wherein the terminal of the receiving path and the terminal of the driving path are at ground level.

18. A light emitting diode (LED) lighting device, comprising:
a transformer having a primary winding on a receiving path to receive electric energy from an energy source and a secondary winding on a driving path;
a primary switch configured to switch on the receiving path to receive and store the electric energy in the transformer, and to switch off the receiving path to allow the driving path to deliver the stored electric energy in a controlled-current driving manner, wherein the stored electric energy is discharged exclusively to one LED array of a plurality of LED arrays in each clock cycle of a controller before the primary switch is switched on again, the controller independently controlling each LED array that is connected in parallel with a capacitor;
an LED array of the LED arrays coupled to the driving path to emit light in response to the delivered electric energy;
a driving switch configured to couple the LED array to the driving path to receive the electric energy from the driving path, wherein a first terminal of the driving switch is directly at ground level and a second terminal of the driving switch is directly at the LED array; and
a bleed circuit configured to adjust a turn-on time of a bleed switch of the bleed circuit in a clock cycle of a colored light to adjust a light emitting power of the colored light, the bleed circuit including a resistor and the bleed switch coupled together in series to the driving path, the resistor coupled to the plurality of LED arrays in parallel, the bleed switch coupled to a plurality of driving switches in parallel.

19. The LED lighting device of claim 18, wherein the receiving path and the delivering path are isolated.

20. The LED lighting device of claim 18, wherein the receiving path and the delivering path are non-isolated.

21. The LED lighting device of claim 18, further comprising:

the controller configured to control a turn-on time of the primary switch in order to control a current for driving the LED array.

22. The LED lighting device of claim 21, wherein the LED array is a first LED array and the driving switch is a first driving switch, further comprising:

a second LED array; and a second driving switch configured to couple the second LED array to the driving path to receive the electric energy from the driving path, wherein the second LED array emits light in response to the electric energy.

23. The LED lighting device of claim 22, wherein the controller is configured to alternatively switch on the first driving switch and the second driving switch to respectively couple the first LED array and the second LED array to the driving path.

24. The LED lighting device of claim 22, further comprising:

N third LED arrays, wherein N is a positive integer; and

N third driving switches configured to respectively couple the N third LED arrays to the driving path to receive the electric energy from the driving path, wherein the N third LED arrays emit light in response to the received electric energy.

25. The LED lighting device of claim 18, wherein the LED array includes a plurality of LED of one color.

26. A method for driving a light emitting diode (LED) lighting device, comprising:

switching on a primary switch to couple a receiving path to an energy source to receive electric energy and to store the received electric energy in a transformer, the transformer having a primary winding on the receiving path and a secondary winding on a driving path;

switching off the primary switch to decouple the receiving path from the energy source and allow the transformer to deliver the stored electric energy in a controlled-current driving manner to an LED array of a plurality of LED arrays via the driving path, wherein the LED array emits light in response to the delivered electric energy, wherein the stored electric energy is discharged exclusively to one LED array of the LED arrays in each clock cycle of a controller before switching on the primary switch again, the controller independently controlling each LED array that is connected in parallel with a capacitor;

switching on a driving switch to couple the LED array to the driving path to receive the delivered electric energy; and adjusting a turn-on time of a bleed switch of a bleed circuit in a clock cycle of a colored light to adjust a light emitting power of the colored light, the bleed circuit including a resistor and the bleed switch coupled together in series to the driving path, the resistor coupled to the plurality of LED arrays in parallel the bleed switch coupled to a plurality of driving switches in parallel.

* * * * *